(12) United States Patent
Groves

(10) Patent No.: US 10,044,252 B1
(45) Date of Patent: Aug. 7, 2018

(54) ELECTROMAGNETIC ACTUATOR STRUCTURE AND ANCHORING ASSEMBLY

(71) Applicant: Oliver James Groves, Freeland, WA (US)

(72) Inventor: Oliver James Groves, Freeland, WA (US)

( * ) Notice: Subject to any disclaimer, the term of this patent is extended or adjusted under 35 U.S.C. 154(b) by 0 days.

(21) Appl. No.: 15/352,498

(22) Filed: Nov. 15, 2016

(51) Int. Cl.
*H02K 41/02* (2006.01)
*H02K 7/00* (2006.01)
*H02K 7/08* (2006.01)

(52) U.S. Cl.
CPC ............. *H02K 41/02* (2013.01); *H02K 7/003* (2013.01); *H02K 7/08* (2013.01)

(58) Field of Classification Search
CPC ...... H02K 41/02; H02K 41/03; H02K 41/031; H02K 7/003; H02K 7/08
USPC .......... 310/12.19, 12.11, 12.13, 12.15, 12.32
See application file for complete search history.

(56) References Cited

U.S. PATENT DOCUMENTS

| 3,279,755 | A  | * | 10/1966 | Notenboom | B66F 11/04 |
| | | | | | 254/93 R |
| 8,695,941 | B1 | * | 4/2014 | Groves | B66F 3/00 |
| | | | | | 254/1 |
| 2011/0043053 | A1 | * | 2/2011 | Shikayama | H02K 41/031 |
| | | | | | 310/12.15 |
| 2013/0015724 | A1 | * | 1/2013 | Trammell | H02K 41/033 |
| | | | | | 310/12.18 |

* cited by examiner

*Primary Examiner* — Michael Andrews
(74) *Attorney, Agent, or Firm* — Michael D. Eisenberg

(57) ABSTRACT

An electromagnetic actuator assembly for moving heavy loads and running on electromagnetic energy has at least one piston providing movement of heavy loads. Two pairs of THK linear rails controls the electromagnetic actuator assembly. A pair of drive motor coil assemblies provides a force to the two pairs of THK linear rails. A foundation houses an internal tube that contains a plurality of cables. A housing mount weldment connects the plurality of cables to a pair of electrical connections of the pair of drive motor coil assemblies, and allows the plurality of cables to extend when traveling back and forth inside the internal tube. The housing mount weldment has a plurality of openings for access to the plurality of cables. An exposed linear encoder runs along the at least one piston, comprising at least one scale providing positional feedback of the at least one piston.

8 Claims, 17 Drawing Sheets

US 10,044,252 B1

ELECTROMAGNETIC ACTUATOR STRUCTURE AND ANCHORING ASSEMBLY

FIELD OF THE INVENTION

The present invention relates to an electromagnetic actuator assembly for moving heavy loads.

BACKGROUND OF THE INVENTION

An electromagnetic actuator assembly comprising either a single stage or a plurality of stages can be used for moving and lifting heavy loads, or for heavy equipment application, and can be sized to the correct lifting capacities up to 40 Kips. This device can be positioned with normal scales such as inches or mm and/or with exposed linear encoders with positional feedback on the single stage variant or used on each stage of the variant with the plurality of stages. In addition, this device can be used on other applications such as opening or closing large doors or gates, lifting truck beds as well as used for lifting automobiles, lifting buildings used with the tornado protection shelters, lifting cargo from ships, crushing and pressing materials, and assist in joining airplane sections together.

The electromagnetic actuator assembly has similar applications to those of a pneumatic actuator or a hydraulic actuator assembly. Hydraulic actuators use hydraulic fluids to position loads and pneumatic actuators use air to position loads, while the electromagnetic actuator assembly uses electricity and magnetic forces to move loads. However, the electromagnetic actuator assembly requires electronic controls for operation and positioning, and requires minor lubrication with little maintenance. Even though hydraulic actuator assembly applications can handle heavy loads, they require a power unit and hydraulic fluid. Over time, replacement parts are needed, such as electronic motors, filters, and hydraulic hoses. In addition, hydraulic systems collect dirt over time due to the internal environment and can become difficult to maintain and keep clean.

Pneumatic single and/or multi-stage actuator assemblies require power units and air filters. Again, over time, replacement parts are needed such as electronic motors, pneumatic filters, and seals/hoses. Maintenance is also required over time. Also, the pneumatic actuator assembly is limited to a lifting capacity which is much lower than hydraulic systems or electromagnetic systems.

BRIEF SUMMARY OF THE EMBODIMENTS OF THE INVENTION

Figure 1:
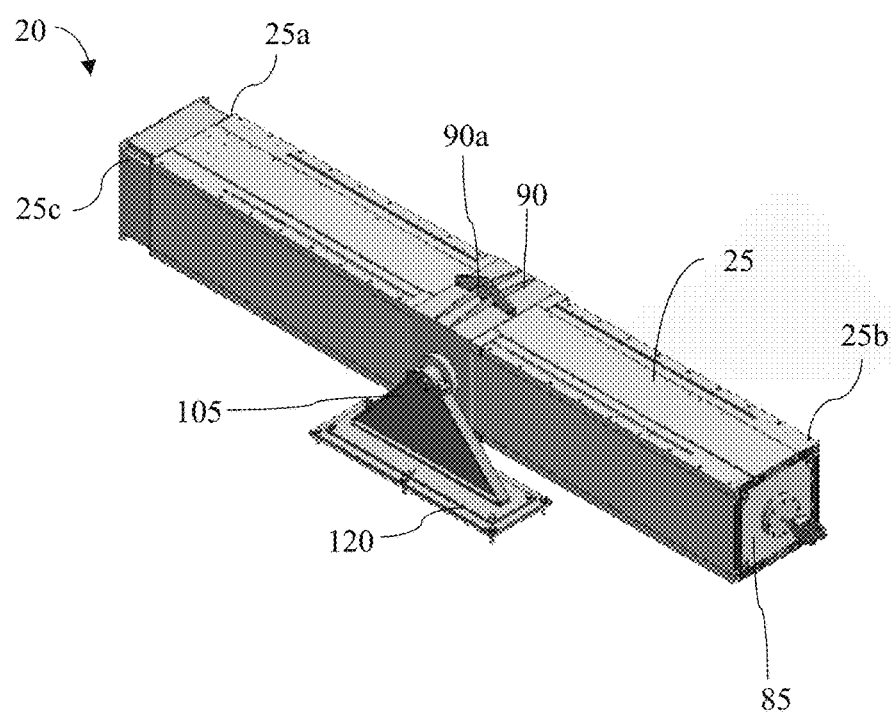
FIG. 1 depicts an aspect of electromagnetic actuator assembly having a pedestal and a floor plate for attaching to a floor.
Figure 2:
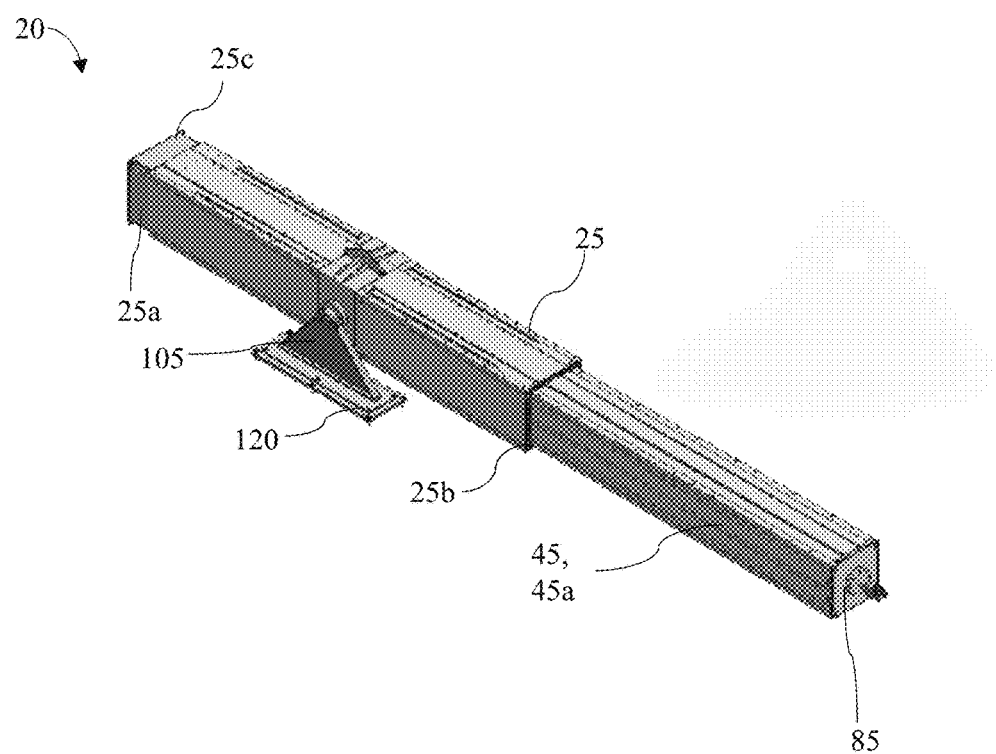
FIG. 2 depicts the electromagnetic actuator assembly having at least one extendable piston.

An electromagnetic actuator assembly for moving heavy loads and running on electromagnetic energy. The electromagnetic actuator assembly has at least one piston for providing movement of heavy loads. Two pairs of THK linear rails controls the electromagnetic actuator assembly. A pair of drive motor coil assemblies provides a force to the two pairs of THK linear rails. A single-stage piston variation of the electromagnetic actuator assembly is extendable up to sixteen feet. In a variant, the electromagnetic actuator assembly comprises a plurality of pistons for providing movement of heavy loads.

A pair of piston outboard plates and a pair of piston side plates of each of the plurality of pistons each has a cross-section that allows for deflection between the pair of drive motor coil assemblies.

A plurality of dowel pins is internally-placed within and along the plurality of pistons, for preventing the plurality of pistons from falling apart while assembled.

A foundation, held in place by a plurality of reinforcing bars, houses an internal tube and has an end. The internal tube contains a plurality of cables and has an end located near the end of the foundation. The internal tube also has a bottom plate located at the end of the foundation.

A plurality of angle support structures is bolted to each of the pair of piston outboard plates and each of the pair of piston side plates of each of the plurality of pistons, and bolted to a housing mount weldment. The housing mount weldment connects the plurality of cables to a pair of electrical connections of the pair of drive motor coil assemblies, and allows the plurality of cables to extend when traveling back and forth inside the internal tube. The housing mount weldment has four sides, on each of which is a plurality of openings. The plurality of openings has a central opening, which is a Neoprene protective window frame for access to the plurality of cables, and all others of the plurality of openings are for viewing and handling the plurality of cables.

A mounting plate is located below the housing mount weldment, secured to the foundation via a plurality of bolts. The mounting plate has a bottom edge, at which is a grouting to keep the foundation level during setup of the electromagnetic actuator assembly. The mounting plate is rectangular in cross-section, and has corners each with cross-sections for supporting each of the pair of piston side plates and each of the pair of piston outboard plates of the plurality of pistons, and preventing misalignment between each of the plurality of pistons, thus increasing tolerance there-between.

An exposed linear encoder runs along the plurality of pistons, comprising at least one scale for providing positional feedback of the plurality of pistons, and gives information in both inches and mm. The exposed linear encoder also comprises a scanning head that operates without mechanical contact. The at least one scale is fastened to a mounting surface of each of the plurality of pistons, and the scanning head is attached to a moving surface of each of the plurality of pistons.

The plurality of pistons has a first piston located at the housing mount weldment, and a last piston located at the second end of the housing. The last piston has an end plate. In a variant, the end plate of the last piston has a spherical ball, pivoting to enable the electromagnetic actuator assembly to handle a loading that is not level.

DETAILED DESCRIPTION OF THE EMBODIMENTS OF THE INVENTION

As generally depicted in FIGS. 1-3, 7, and 8, an electromagnetic actuator assembly 20 for moving heavy loads and running on electromagnetic energy, comprises a housing 25 comprising a pair of actuator side plates 30 and a pair of actuator outboard plates 35. The housing 25 has a first end 25a and a second end 25b. The pair of actuator side plates 30 are placed opposite each other and perpendicular to the pair of actuator outboard plates 35, also placed opposite each other. The pair of actuator outboard plates 35 has a lower actuator outboard plate 35a and an upper actuator outboard plate 35b. A pair of actuator inboard plates 40 are placed opposite each other, within the housing 25. FIG. 3a depicts that in one variant, each of the pair of actuator inboard plates 40 is placed along and overlaps in direct contact with one of each of the pair of actuator outboard plates 35, for providing structural integrity of the electromagnetic actuator assembly 20. FIG. 3b depicts that in another variant, an actuator inboard plate 40 is rotated 90° and is not in direct contact with an actuator outboard plate 35.

The electromagnetic actuator assembly 20 has at least one piston 45 for providing movement of heavy loads. The at least one piston 45 comprises a pair of piston side plates 50 and a pair of piston outboard plates 55 (both depicted in FIGS. 9 and 10). The pair of piston side plates 50 is placed opposite each other and perpendicular to the pair of piston outboard plates 55, also placed opposite each other.

A piston head 85 (FIGS. 1, 2, 6, 8, and 9) is located at the second end 25b of the housing 25, and the piston head 85 has a first opposing side and a second opposing side.

FIGS. 1, 2, 4, and 5 depict that the electromagnetic actuator assembly 20 further comprises a support bracket assembly 90 encased around and holding together the pair of actuator side plates 30 and the pair of actuator outboard plates 35. The support bracket assembly 90 is held in place by an attachment 90a. The attachment 90a is also for handling and lifting the electromagnetic actuator assembly 20.

Figure 5:
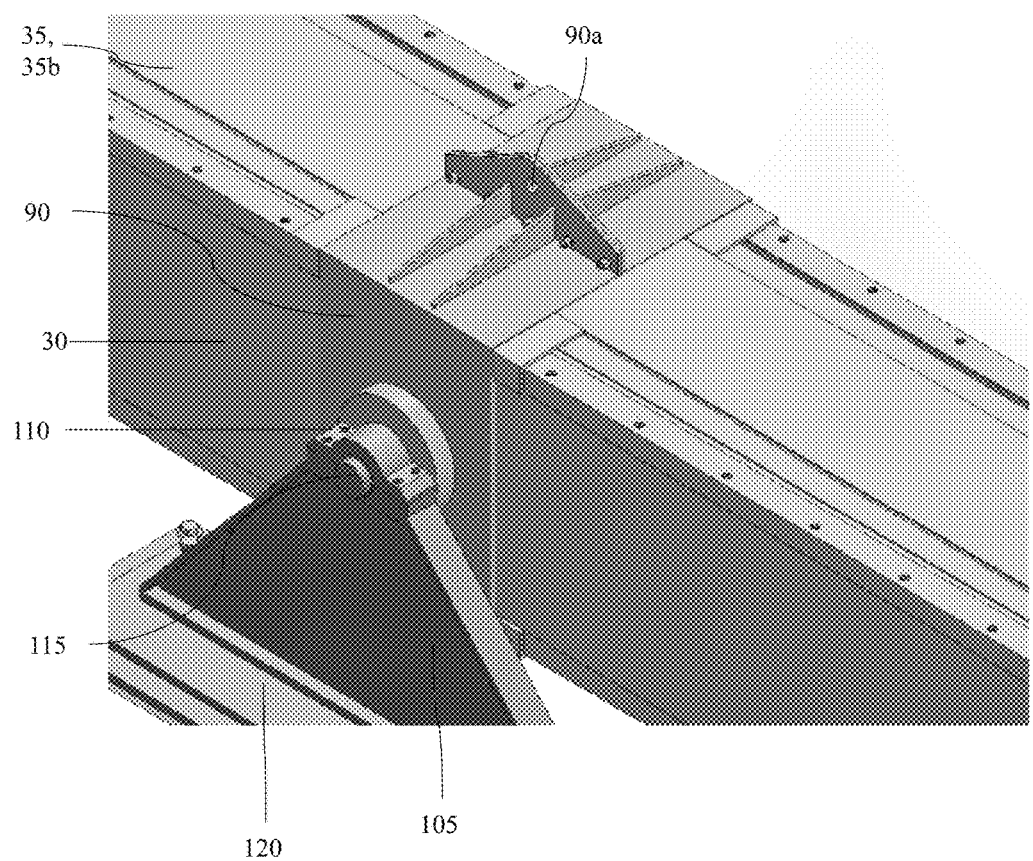
FIG. 5 depicts a support bracket assembly and an attachment of the electromagnetic actuator assembly.

The electromagnetic actuator assembly 20 also has (not shown) a first pair of locating shear pads, a second pair of locating shear pads, a third pair of locating shear pads, and a fourth pair of locating shear pads, with the first pair of locating shear pads and the second pair of locating shear pads being located around the support bracket assembly 90 on the upper actuator outboard plate 35b, and the third pair of locating shear pads and the fourth pair of locating shear pads being located around the support bracket assembly 90 on the lower actuator outboard plate 35a. A plurality of fasteners is located on the attachment 90a of the support bracket assembly 90 on both the lower actuator outboard plate 35a and the upper actuator outboard plate 35b (FIGS. 5 and 6).

The electromagnetic actuator assembly 20 further comprises the pair of piston outboard plates 55 held in place by a plurality of screws, and a corresponding plurality of washers, for instance socket head screws having dimensions of 0.625 inch in diameter and 1.75 inch in length, and hi-collar lock washers. The magnetic assembly 70 is held in place via a plurality of screws, and a corresponding plurality of washers, for instance socket head screws having-dimensions of 0.312-0.324 inch in diameter and 0.87 inch in length, and hi-collar lock washers. A first pair of dowel pins is located on the first opposing side of the piston head 85, and a second pair of dowel pins is located on the second opposing side of the piston head 85, for securing the piston head 85. A first pair of stops and a second pair of stops, each located on one of the pair of piston outboard plates 55, secures the pair of piston outboard plates 55. FIGS. 1, 2, 4, and 7 depict an enclosure 25c is located at, and encloses, the first end 25a of the housing 25.

Figure 6:
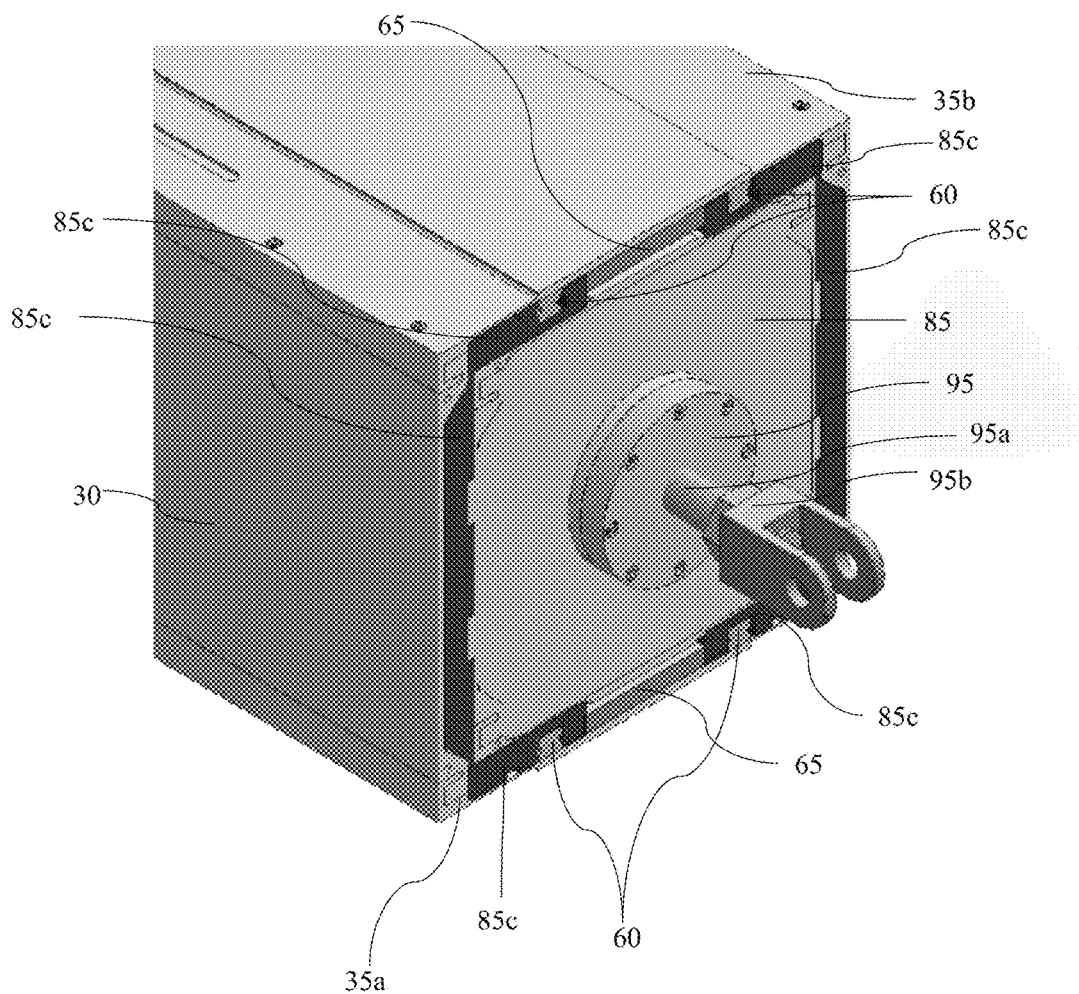
FIG. 6 illustrates a piston head, a Clevis mount assembly, a Clevis rod, and a Clevis head.
Figure 7:
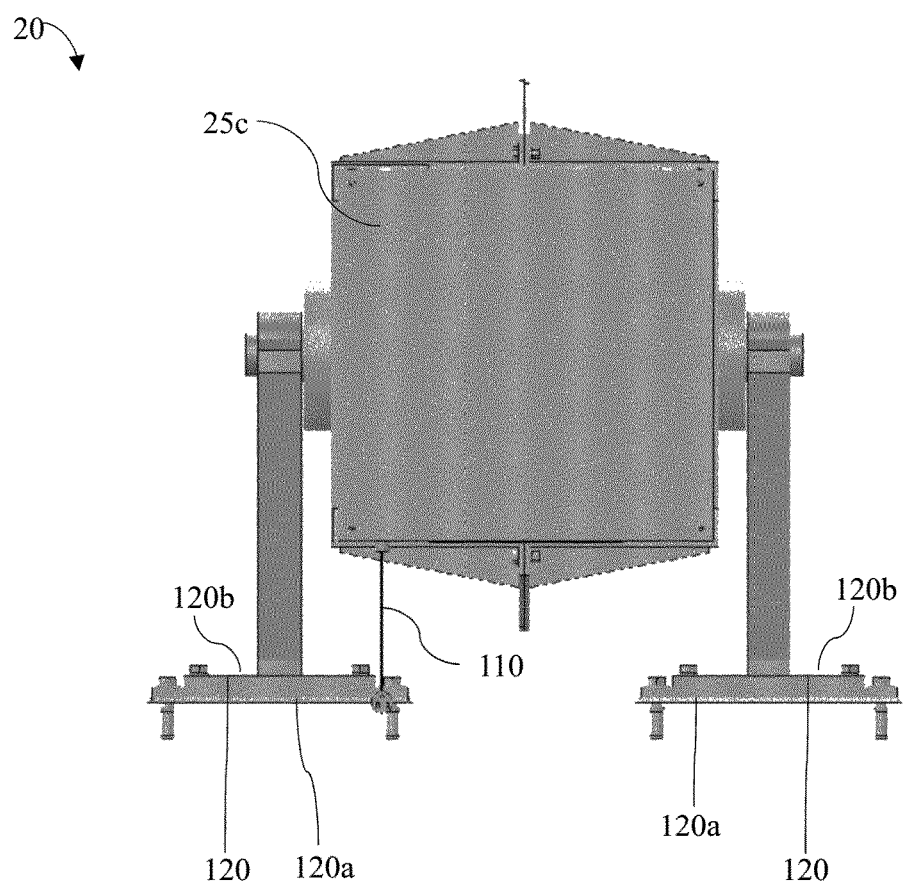
FIG. 7 depicts a rear view of the electromagnetic actuator assembly, having an enclosure.
Figure 8:
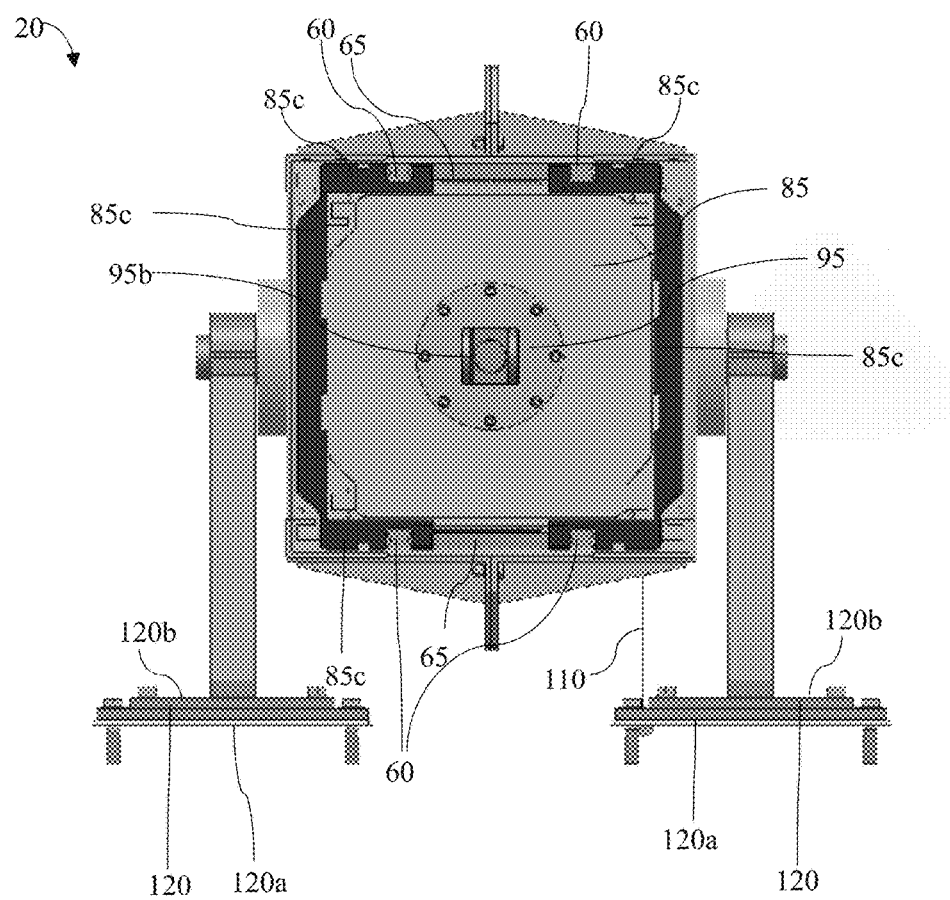
FIG. 8 depicts a front view of the electromagnetic actuator assembly, detailing the piston head.
Figure 9:
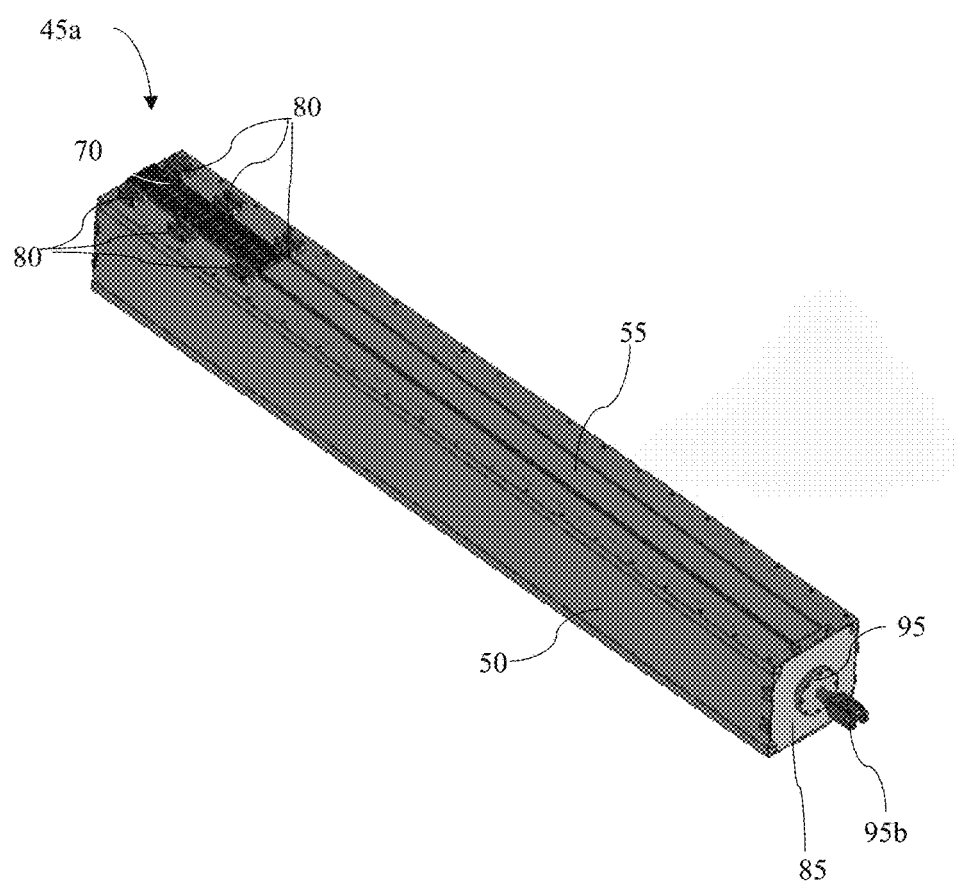
FIG. 9 depicts a single-stage piston having a plurality of THK blocks and a magnetic assembly.

FIGS. 6, 8, and 9 illustrate that the electromagnetic actuator assembly 20 further comprises the piston head 85 having a Clevis mount assembly 95. The Clevis mount assembly 95 is held in place via a plurality of screws and a corresponding plurality of washers, for instance grade 8 socket head screws and hi-collar lock washers. The Clevis mount assembly 95 has a Clevis rod 95a to which is attached a Clevis head 95b for adjusting stroke of the electromagnetic actuator assembly 20, allowing for small changes in stroke as needed. A hex nut is located before the Clevis head 95b on the Clevis rod 95a. The hex nut secures the Clevis mount assembly 95 via tightening of the hex nut. The Clevis head 95b is replaceable with an alternate head type configuration.

The electromagnetic actuator assembly 20 further comprises an electrical cord 100 (FIGS. 4, 7, and 8) providing AC energy to the electromagnetic actuator assembly 20, and located on the lower actuator outboard plate 35a. FIGS. 1, 2, 4, 5, 7, and 8 illustrate that each actuator side plate 30 is attached to a pedestal 105 via a Trunnion mounting cap 110 and a shaft 115 (having a 4" diameter") at the support bracket assembly 90 on both of the pair of actuator side plates 30. The pedestal 105 is attached to a floor plate 120. The floor plate 120 has a grouting, for keeping the floor plate 120 level during setup of the electromagnetic actuator assembly 20. The floor plate 120 has a bottom side 120a and an upper side 120b. A pair of bolts, for instance HELTI anchor bolts, on the bottom side 120a of the floor plate 120, bolts the electromagnetic actuator assembly 20 to a floor. A pair of bolts, for instance grade 8 UNC Hex Head bolts, on the upper side 120b of the floor plate 120, with each flanking the pedestal 105, additionally secures the electromagnetic actuator assembly 20 to the floor.

The electromagnetic actuator assembly 20 further comprises a group of four wiper Neoprene seals 85c surrounding the piston head 85, for sealing the piston head 85 from a surrounding environment.

Figure 3A:
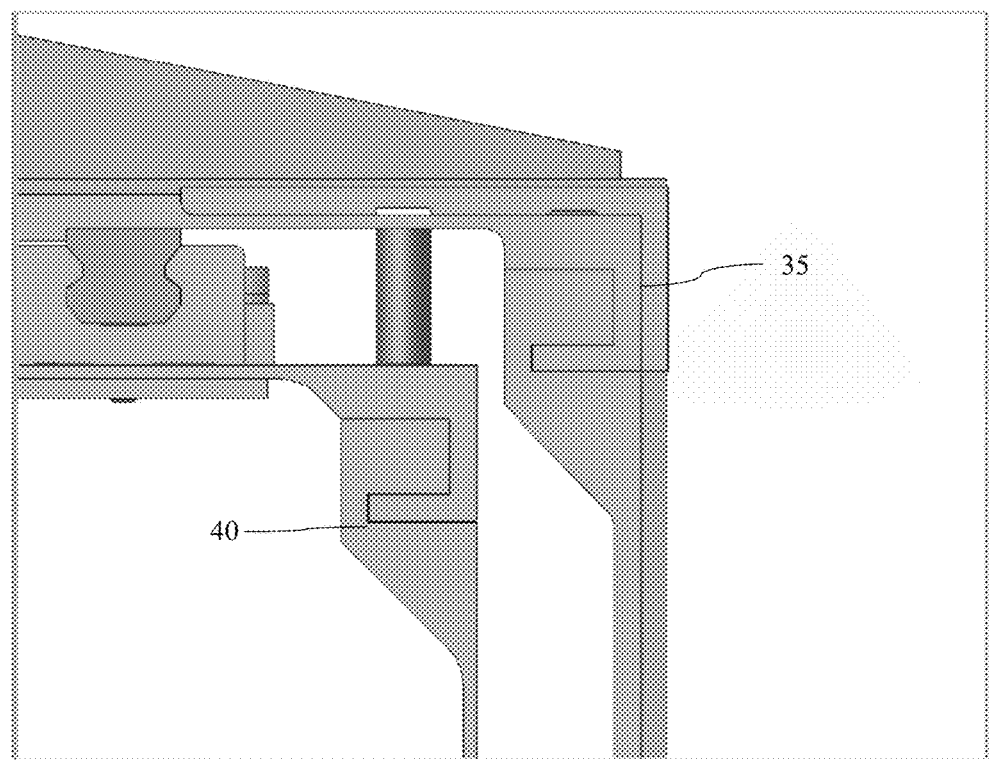
FIG. 3a depicts an actuator inboard plate and an actuator outboard plate of an electromagnetic actuator assembly having a single-stage piston.

A single-stage piston 45a (FIG. 2) variant of the electromagnetic actuator assembly 20 is extendable up to sixteen feet. FIG. 3a depicts the orientation of the pair of actuator inboard plates 40 to the pair of actuator outboard plates 35 for the single-stage piston 45a variant. In this variant, each of the actuator outboard plates 35 has a pair of magnetic assemblies 70 running along a length of each of the actuator outboard plates 35. Each of the pair of magnetic assemblies 70 has a first side and a second side that each generate a force of 20 Kips, and a total force of 40 Kips for the single-stage piston 45*a* while in motion.

Figure 3B:
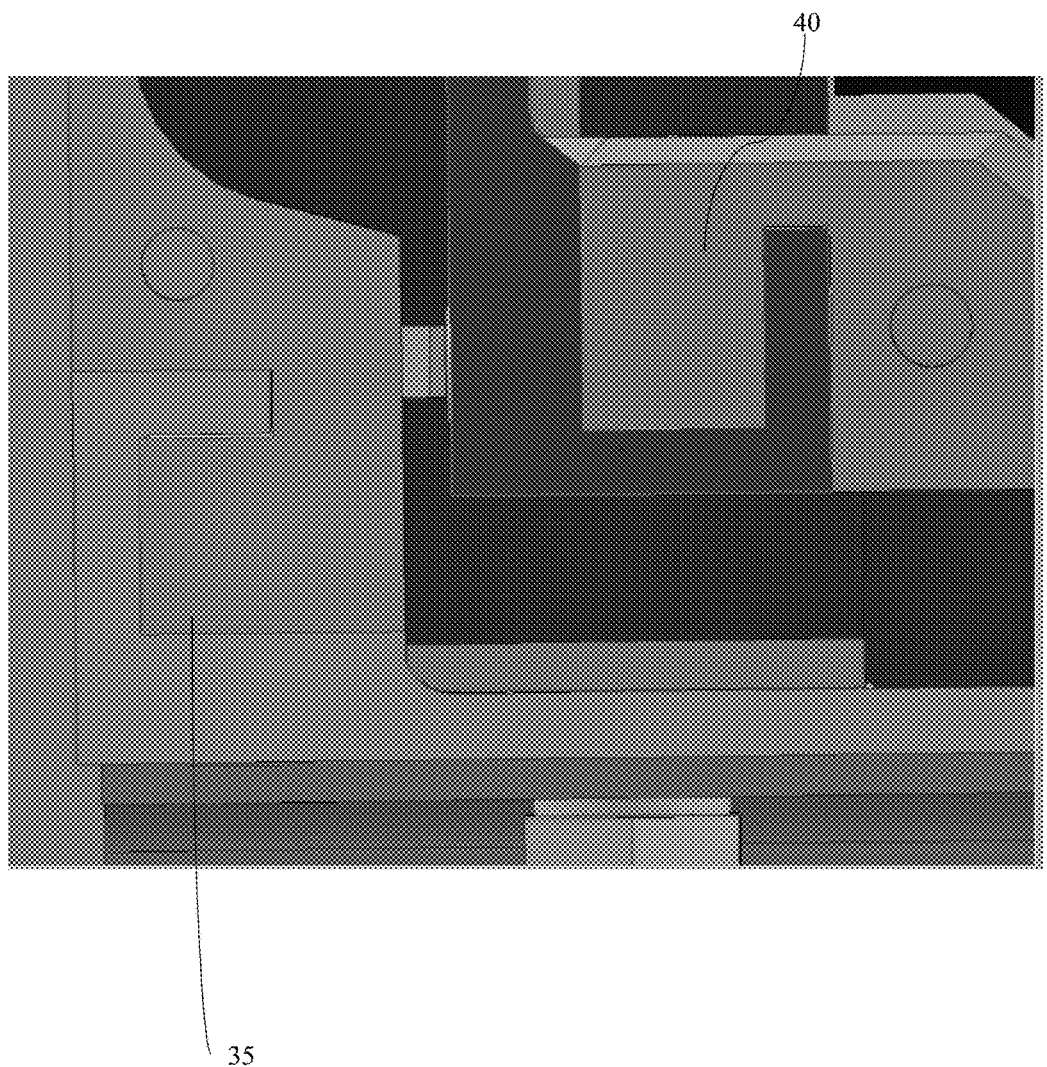
FIG. 3b depicts an actuator inboard plate and an actuator outboard plate of an electromagnetic actuator assembly having a plurality of pistons.
Figure 4:
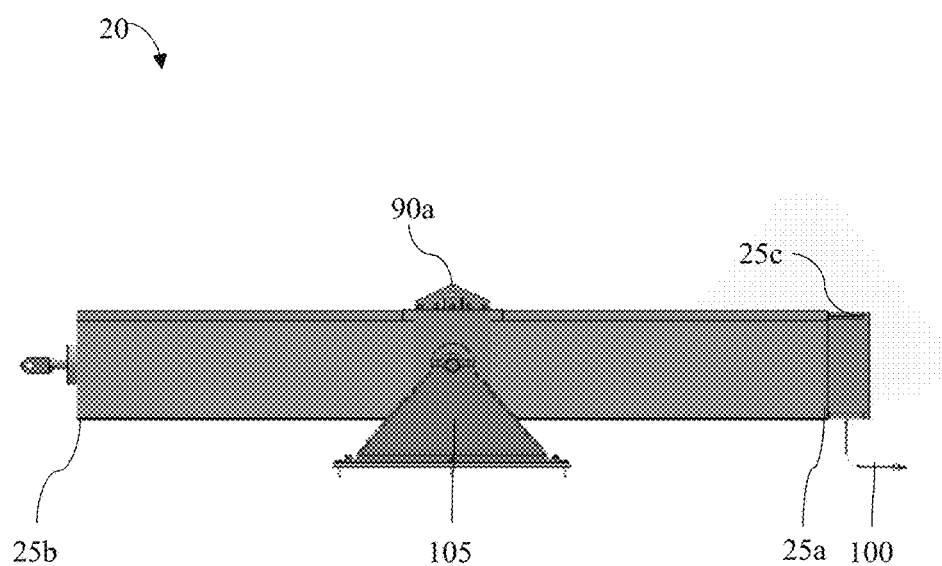
FIG. 4 depicts a side view of the electromagnetic actuator assembly.
Figure 11:
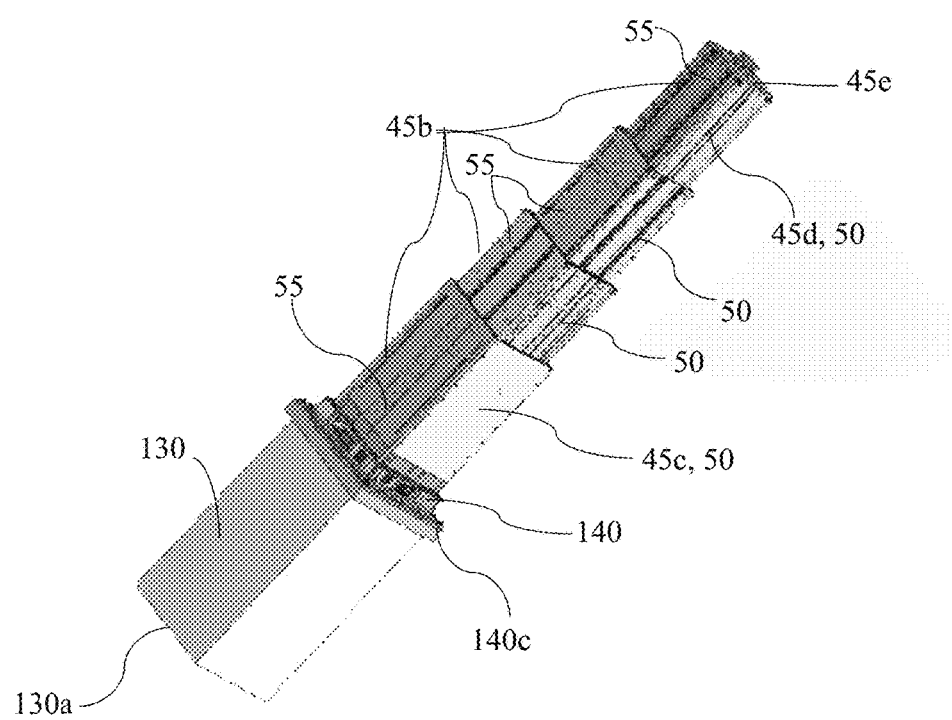
FIG. 11 illustrates a plurality of a three stage pistons, a foundation, sub plate, a housing mount weldment having a plurality of openings and a primary housing.
Figure 12:
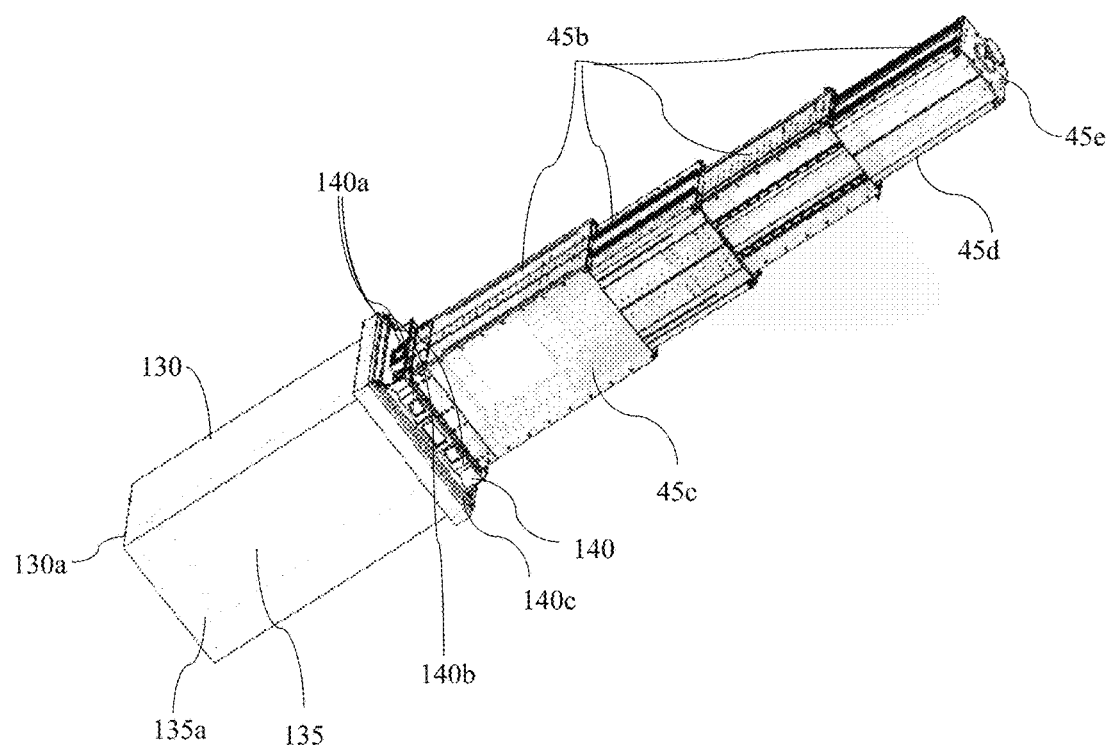
FIG. 12 is a further illustration of FIG. 11, also illustrating an internal tube with the foundation.

FIGS. 11 and 12 illustrate that in another variant, the electromagnetic actuator assembly 20 comprises a plurality of pistons 45*b* for providing movement of heavy loads. Each of the plurality of pistons 45*b* comprises a pair of piston side plates 50 and a pair of piston outboard plates 55. The pair of piston side plates 50 of each of the plurality of pistons 45*b* is opposite each other and perpendicular to corresponding the pair of piston outboard plates 55 of each of the plurality of pistons 45*b*, also opposite each other. FIG. 3*b* depicts the orientation of the pair of actuator inboard plates 40 to the pair of actuator outboard plates 35 for the plurality of pistons 45*b* variant.

FIGS. 6 and 8 illustrate that in this variant having a plurality of pistons 45*b*, two pairs of THK linear rails 60 control the electromagnetic actuator assembly 20. The two pairs of THK linear rails 60 are mounted vertically with respect to each other, with one of each of the two pairs of THK linear rails 60 placed on one of each of the pair of actuator outboard plates 35. A pair of drive motor coil assemblies 65 provides a force to the two pairs of THK linear rails 60, with one of each attached along a length of each of the pair of actuator inboard plates 40.

Figure 10:
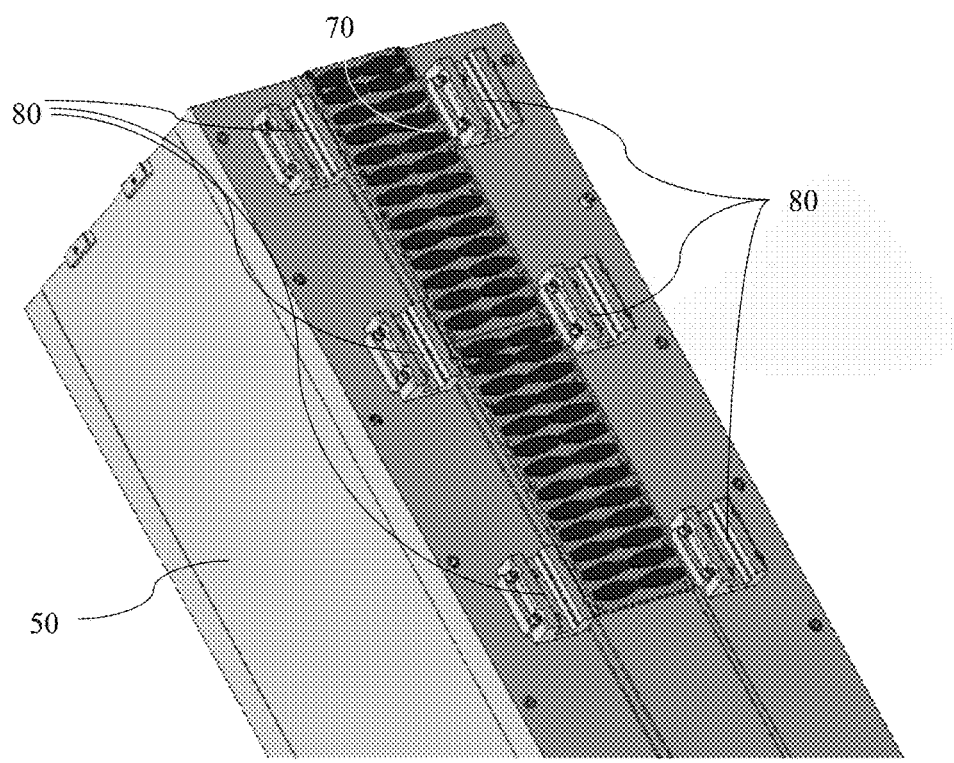
FIG. 10 depicts a close-up of FIG. 9.

Each of the two pairs of THK linear rails 60 are also mounted on a magnetic assembly 70, also for providing a force to the two pairs of THK linear rails 60, within each of the pair of actuator outboard plates 35. The two pairs of THK linear rails 60 and the pair of drive motor coil assemblies 65 are maintained in alignment via the pair of actuator inboard plates 40. FIGS. 9 and 10 depict that a plurality of THK blocks 80 controls and maintains a space between the pair of actuator outboard plates 35 and the pair of actuator inboard plates 40. The plurality of THK blocks 80 is divided into four groups of three, each group placed along one of the actuator inboard plates 40 opposite another group adjacent to the magnetic assembly 70.

The electromagnetic actuator assembly 20 has the following further novel characteristics:

Each of the pair of piston outboard plates 55 and each of the pair of piston side plates 50 of each of the plurality of pistons 45*b* has a cross-section that allows for deflection between the pair of drive motor coil assemblies 65.

A plurality of dowel pins is internally-placed within and along the plurality of pistons 45*b*, for preventing the plurality of pistons 45*b* from falling apart while assembled.

FIGS. 11 and 12 depict that a foundation 130, held in place by a plurality of reinforcing bars, houses an internal tube 135 and has an end 130*a*. The internal tube 135 contains a plurality of cables (not shown) and has an end 135*a* located near the end 130*a* of the foundation 130. The internal tube 135 also has a bottom plate 135*b* located at the end 130*a* of the foundation 130.

Figure 14:
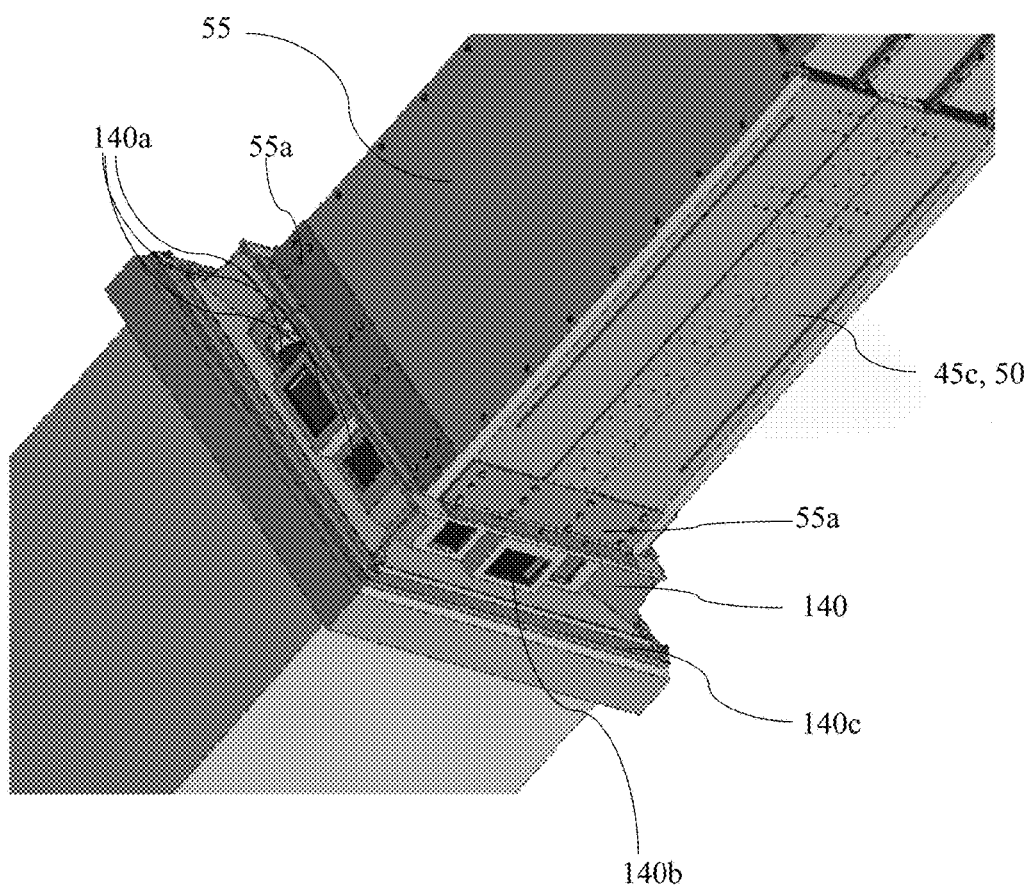
FIG. 14 is yet a further illustration of FIG. 11, detailing the housing mount weldment having the plurality of openings.

A plurality of angle support structures 55*a* is bolted to each of the pair of piston outboard plates 55 and each of the pair of piston side plates 50 of each of the plurality of pistons 45*b*, and bolted to a housing mount weldment 140 (FIGS. 11, 12, and 14). The housing mount weldment 140 connects the plurality of cables to a pair of electrical connections of the pair of drive motor coil assemblies 65, and allows the plurality of cables to extend when traveling back and forth inside the internal tube 135. FIGS. 12 and 14 illustrate that the housing mount weldment 140 has four sides, on each of which is a plurality of openings 140*a*. The plurality of openings 140*a* has a central opening 140*b*, which is a Neoprene protective window frame for access to the plurality of cables, and all others of the plurality of openings 140*a* are for viewing and handling the plurality of cables, as FIG. 14 depicts.

A mounting plate 140*c* (FIGS. 11, 12, and 14) is located below the housing mount weldment 140, secured to the foundation 130 via a plurality of bolts. The mounting plate 140*c* has a bottom edge, at which is a grouting to keep the foundation 130 level during setup of the electromagnetic actuator assembly 20. The mounting plate 140*c* is rectangular in cross-section, and has corners each with cross-sections for supporting each of the pair of piston side plates 50 and each of the pair of piston outboard plates 55 of the plurality of pistons 45*b*, and preventing misalignment between each of the plurality of pistons 45*b*, thus increasing tolerance there-between.

An exposed linear encoder 145 (FIG. 13) runs along the plurality of pistons 45*b*, comprising at least one scale 145*a* (FIG. 13) for providing positional feedback of the plurality of pistons 45*b*, and gives information in both inches and mm. The exposed linear encoder 145 also comprises a scanning head (not shown) that operates without mechanical contact. The at least one scale 145*a* is fastened to a mounting surface of each of the plurality of pistons 45*b*, and the scanning head is attached to a moving surface of each of the plurality of pistons 45*b*.

Figure 13:
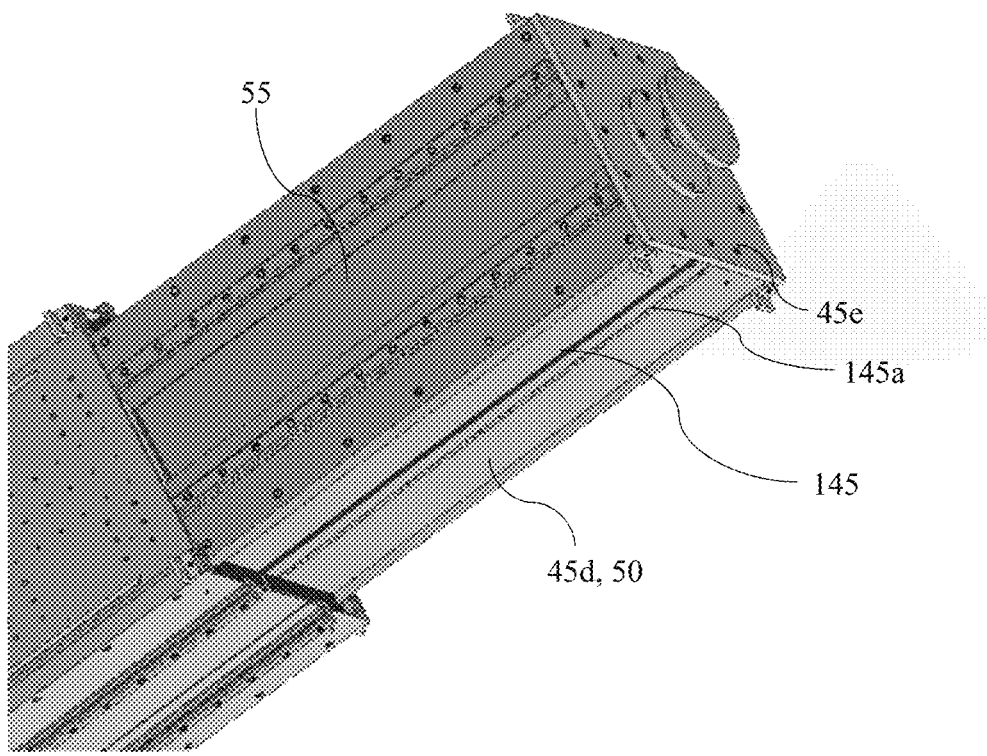
FIG. 13 depicts an exposed linear encoder.

The plurality of pistons 45*b* has a first piston 45*c* located at the housing mount weldment 140, and a last piston 45*d* located at the second end 25*b* of the housing 25. FIGS. 11-13 depict that the last piston 45*d* has an end plate 45*e*. In a variant, the end plate 45*e* of the last piston 45*d* has a spherical ball (not shown), pivoting to enable the electromagnetic actuator assembly 20 to handle a loading that is not level.

In a variant, the internal tube 135 is comprised of PVC.

In another variant, the exposed linear encoder 145 allows for accuracy of positioning within 5 μm.

In a further variant, each of the plurality of openings 140*a* of the housing mount weldment 140 comprises three openings.

Figure 16:
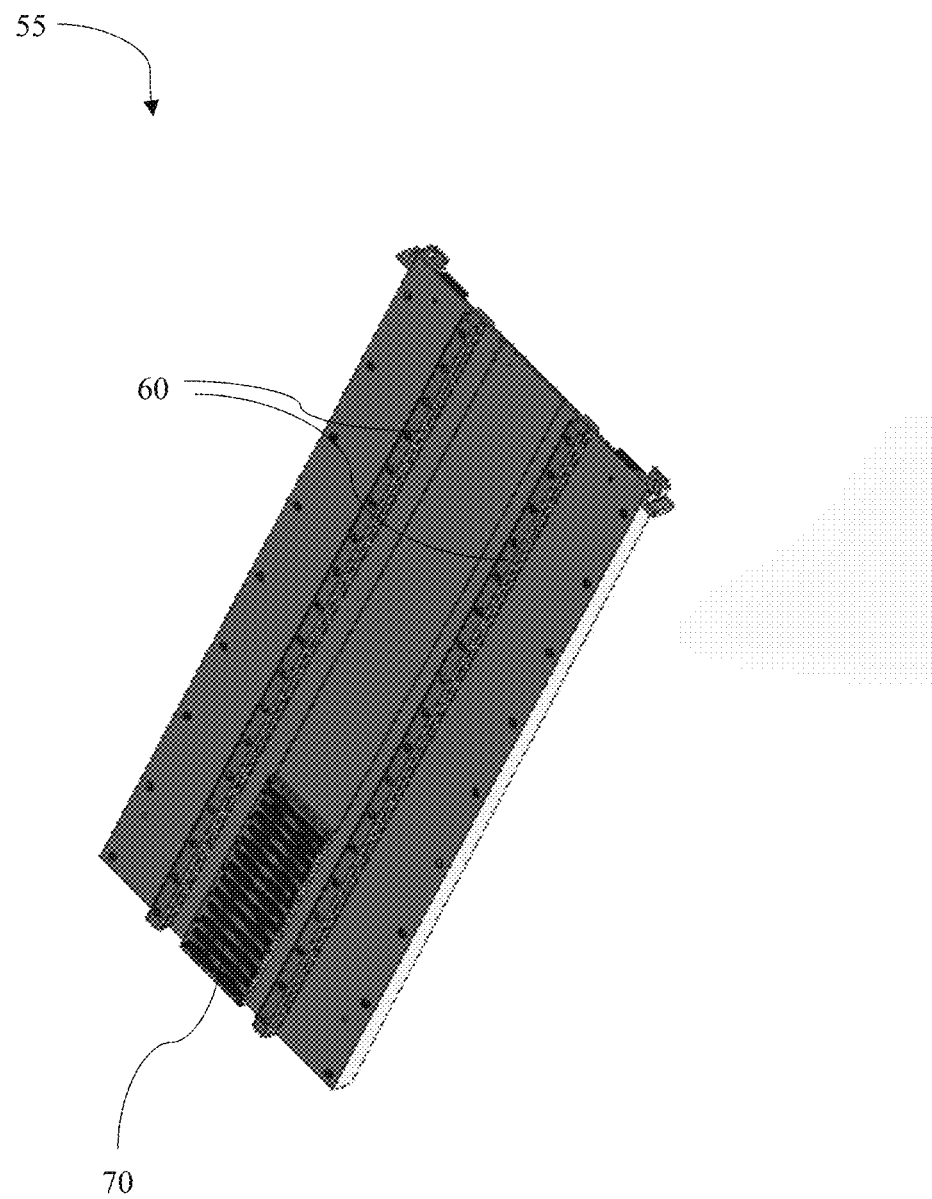
FIG. 16 depicts a piston outboard plate of one of the plurality of pistons.

As depicted in FIG. 16, the magnetic assembly 70 on each of the actuator outboard plates 35 also are mounted on each of the piston outboard plates 55 of each of the plurality of pistons 45*b*, and generate a force of 10 Kips for each of the plurality of pistons 45*b* while in motion.

The plurality of THK blocks 80 is attached to the pair of THK linear rails 60 via a plurality of roller bearings, providing a distance of 0.88 mm maintained through an entire extended length of a piston 45, to generate a force of 10 Kips for each of the plurality of pistons 45*b* while in motion.

Given that one magnetic assembly 70 provides a force of 10 Kips, additional force can be added by adding an additional magnetic assembly 70, therefore doubling the force being lifted, pushed or pulled. However, if an additional magnetic assembly 70 is added, extending the length of the stroke is necessary, which extends the length of the pair of THK linear rails 60 and the pair of actuator outboard plates 35 and the pair of actuator inboard plates 40.

The main principle of operation of the electromagnetic actuator assembly 20 variant having the plurality of pistons 45*b* is by linear drive motors, which are a three-phase AC Motor consisting of two separate parts designed to provide a motive force along a linear path. The three-phase AC motor is directly connected to a three-phase motor drive amplifier, and slide position feedback is sent to a machine controller. The magnetic assembly 70 is attached to one stage and the pair of drive motor coil assemblies 65 is attached or located on another other stage.

Figure 15:
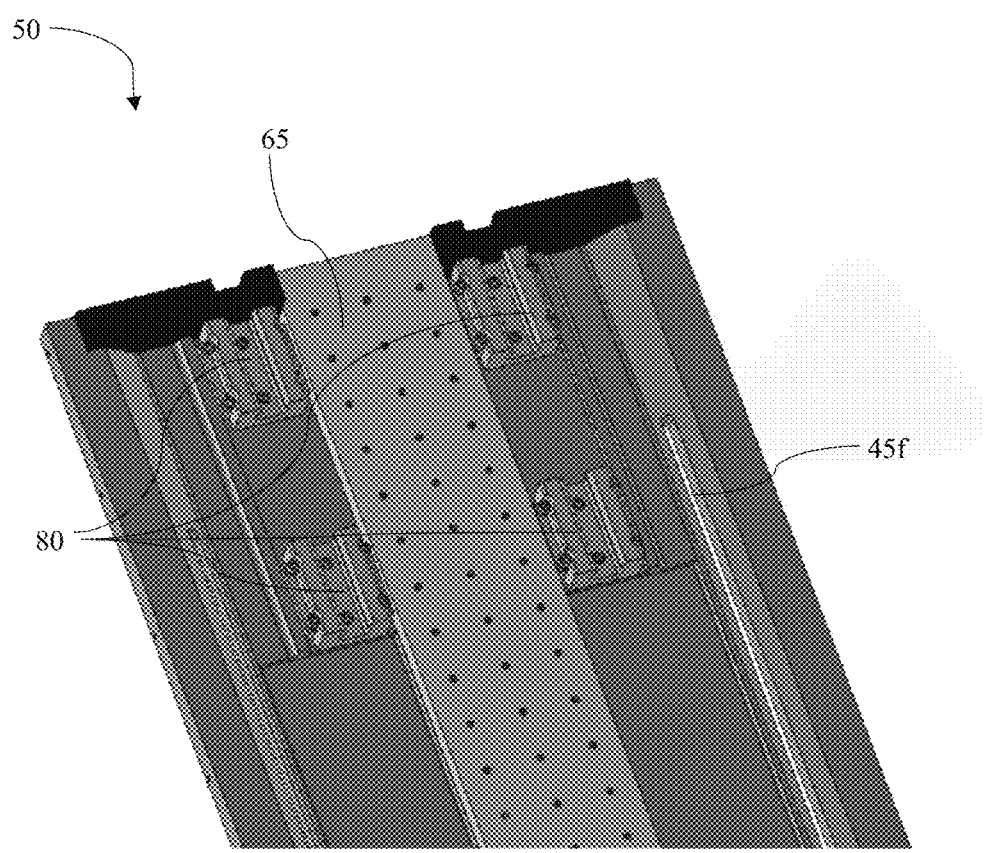
FIG. 15 depicts a piston side plate of one of the plurality of pistons.

The dowel pins are installed during assembly. First, the piston side plates 50 of each of the plurality of pistons 45*b* are drilled and reamed into, to create a pair of slots 45*f*, depicted in FIG. 15; then the dowel pins are press-fitted into these slots 45*f* along each of the piston side plates 50, allowing a top surface of a dowel pin to be flush with each of the piston outboard plates 55 of each of the plurality of pistons 45*b*. The dowel pins are needed to prevent the plurality of pistons 45*b* from traveling further than the slots when assembling and disassembling the electromagnetic actuator assembly 20.

The lifting capacity of the electromagnetic actuator assembly 20 variant having the plurality of pistons 45*b* is 20,000 lbs. (44,000 Newtons). Each piston has a maximum stroke of 60 inches. The length of each piston is 84 inches.

What is claimed is:

1. An electromagnetic actuator assembly for moving loads, comprising:
    a housing comprising a pair of actuator side plates and a pair of actuator outboard plates;
    the housing having a first end and a second end;
    the pair of actuator side plates being placed opposite each other and perpendicular to the pair of actuator outboard plates, also being placed opposite each other;
    the pair of actuator outboard plates having a lower actuator outboard plate and an upper actuator outboard plate;
    a pair of actuator inboard plates being placed opposite each other, within the housing;
    each of the pair of actuator inboard plates being placed along and overlapping in direct contact with one of each of the pair of actuator outboard plates, for providing structural integrity of the electromagnetic actuator assembly;
    at least one piston for providing movement of loads;
    the at least one piston comprising a pair of piston side plates and a pair of piston outboard plates;
    the pair of piston side plates being placed opposite each other and perpendicular to the pair of piston outboard plates, also being placed opposite each other;
    a piston head being located at the second end of the housing; and
    the piston head having a first opposing side and a second opposing side;
    a support bracket assembly being encased around and holding together the pair of actuator side plates and the pair of actuator outboard plates;
    the support bracket assembly being held in place by an attachment;
    the attachment also for handling and lifting the electromagnetic actuator assembly;
    a first pair of locating shear pads, a second pair of locating shear pads, a third pair of locating shear pads, and a fourth pair of locating shear pads, with the first pair of locating shear pads and the second pair of locating shear pads being located around the support bracket assembly on the upper actuator outboard plate, and the third pair of locating shear pads and the fourth pair of locating shear pads being located around the support bracket assembly on the lower actuator outboard plate.

2. The electromagnetic actuator assembly of claim 1, wherein:
    the support bracket assembly being held in place by an attachment;
    the attachment also for handling and lifting the electromagnetic actuator assembly;
    and further comprising a plurality of fasteners located on the attachment of the support bracket assembly on both the lower actuator outboard plate and the upper actuator outboard plate.

3. The electromagnetic actuator assembly of claim 2, further comprising
    a group of four wiper seals surrounding the piston head, for sealing the piston head from a surrounding environment.

4. The electromagnetic actuator assembly of claim 2, further comprising a single-stage piston extendable up to sixteen feet.

5. The electromagnetic actuator assembly of claim 4, further comprising:
    each of the actuator outboard plates having a pair of magnetic assemblies running along a length of each of the actuator outboard plates.

6. The electromagnetic actuator assembly of claim 1, further comprising:
    the piston head having a clevis mount assembly;
    the clevis mount assembly being held in place via a plurality of screws and a corresponding plurality of washers;
    the clevis mount assembly having a Clevis rod to which is attached a clevis head for adjusting stroke of the electromagnetic actuator assembly, allowing for small changes in stroke as needed;
    a hex nut being located before the clevis head on the clevis rod;
    the hex nut securing position of the Clevis mount assembly via tightening of the hex nut; and
    the clevis head being replaceable with an alternate head type configuration.

7. The electromagnetic actuator assembly of claim 1, further comprising:
    an electrical cord providing AC energy to the electromagnetic actuator assembly, and being located on the lower actuator outboard plate;
    each of the pair of actuator side plates being attached to a pedestal via a mounting cap and a shaft, at the support bracket assembly on both of the pair of actuator side plates;
    the pedestal being attached to a floor plate;
    the floor plate having a grouting, for keeping the floor plate level during setup of the electromagnetic actuator assembly;
    the floor plate having a bottom side and an upper side;
    a pair of bolts on the bottom side of the floor plate, for bolting the electromagnetic actuator assembly to a floor; and
    a pair of bolts on the upper side of the floor plate, with each flanking the pedestal, for additionally securing the electromagnetic actuator assembly to the floor.

8. An electromagnetic actuator assembly for moving loads, comprising:
    a housing comprising a pair of actuator side plates and a pair of actuator outboard plates;
    the housing having a first end and a second end;
    the pair of actuator side plates being placed opposite each other and perpendicular to the pair of actuator outboard plates, also being placed opposite each other;
    the pair of actuator outboard plates having a lower actuator outboard plate and an upper actuator outboard plate;
    a pair of actuator inboard plates being placed opposite each other, within the housing;

each of the pair of actuator inboard plates being placed along and overlapping in direct contact with one of each of the pair of actuator outboard plates, for providing structural integrity of the electromagnetic actuator assembly;

at least one piston for providing movement of loads;

the at least one piston comprising a pair of piston side plates and a pair of piston outboard plates;

the pair of piston side plates being placed opposite each other and perpendicular to the pair of piston outboard plates, also being placed opposite each other;

a piston head being located at the second end of the housing; and the piston head having a first opposing side and a second opposing side;

a first pair of dowel pins located on the first opposing side of the piston head, and a second pair of dowel pins located on the second opposing side of the piston head, for securing the piston head;

a first pair of stops and a second pair of stops, each being located on one of the pair of piston outboard plates, for securing the pair of piston outboard plates.

* * * * *